Nov. 27, 1923

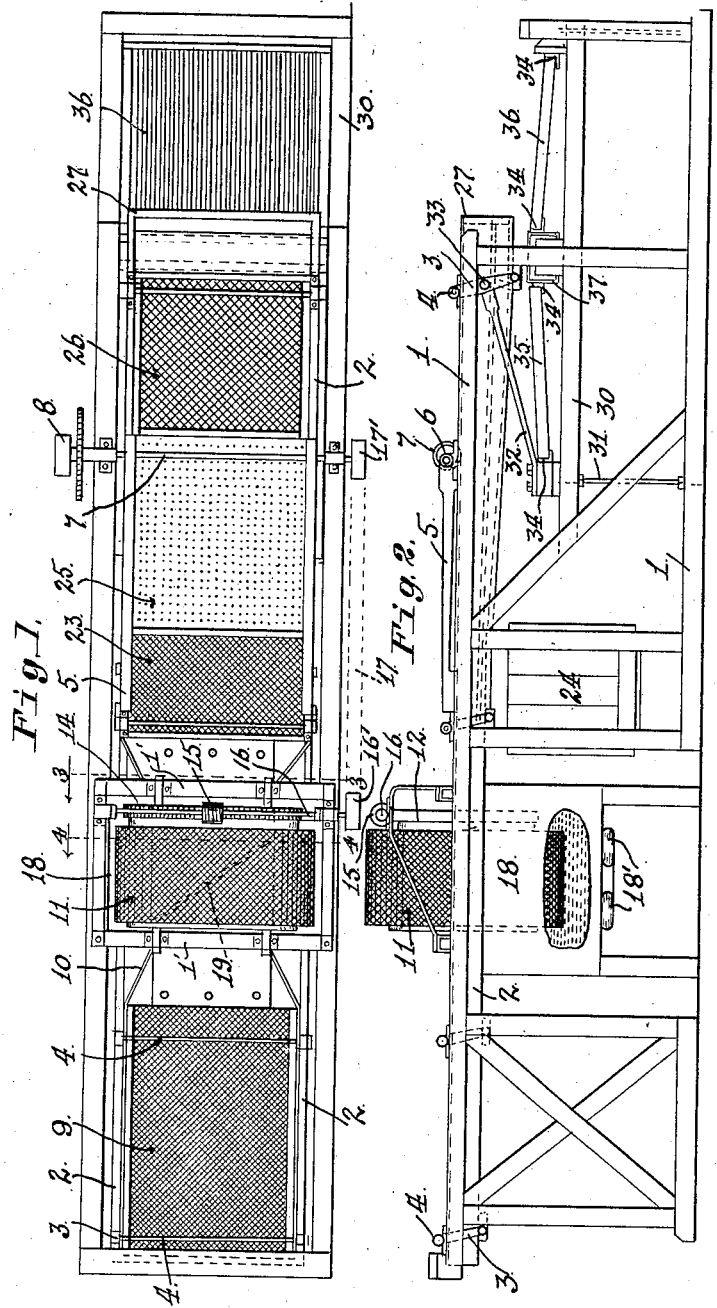

E. S. ANDERSON

PRUNE DIPPER AND GRADER

Filed Aug. 14, 1923

INVENTOR.
Elmer S. Anderson
BY Booth & Booth
ATTORNEYS.

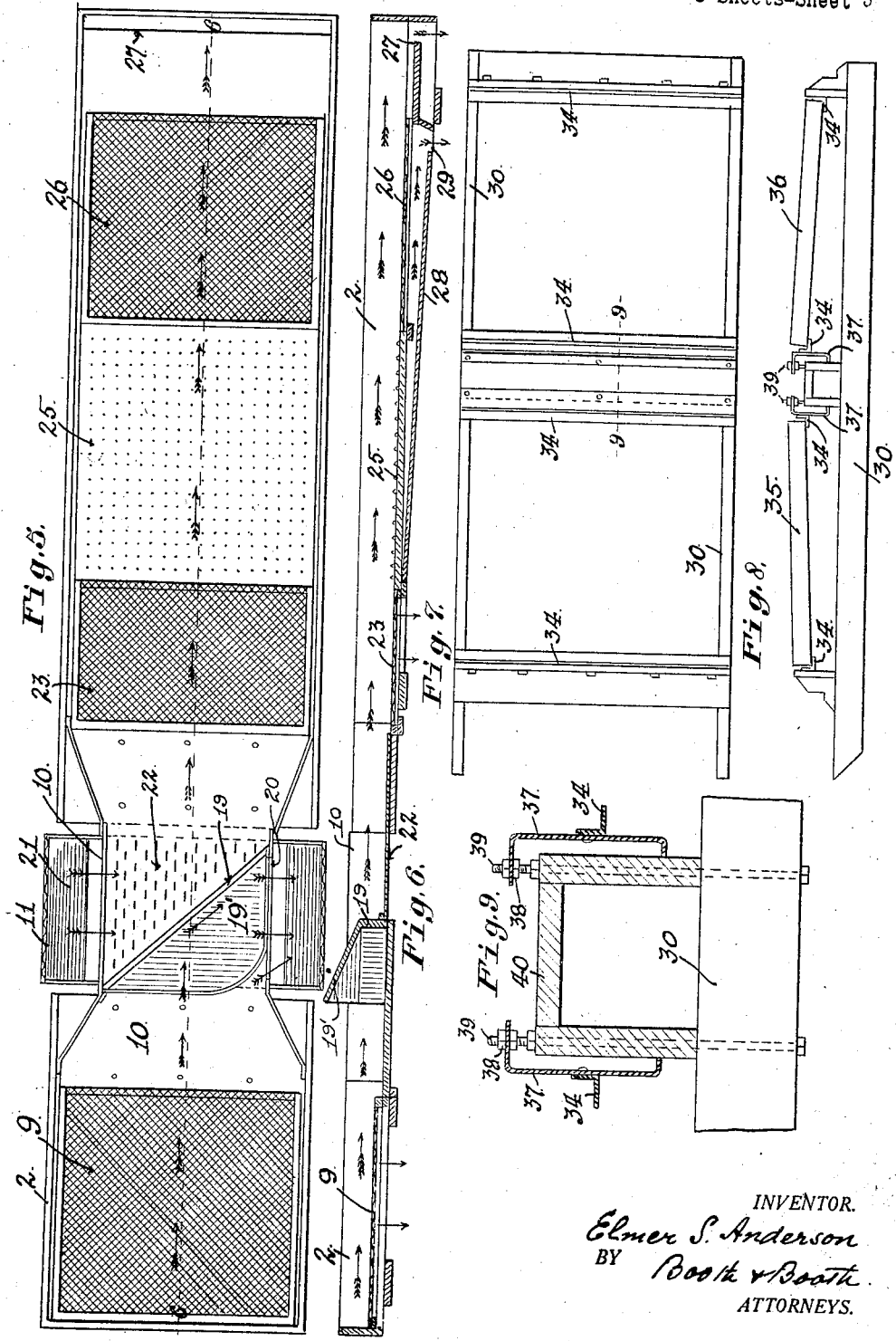

Patented Nov. 27, 1923.

1,475,419

UNITED STATES PATENT OFFICE.

ELMER S. ANDERSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

PRUNE DIPPER AND GRADER.

Application filed August 14, 1923. Serial No. 657,353.

*To all whom it may concern:*

Be it known that I, ELMER S. ANDERSON, a citizen of the United States, residing at San Jose, in the county of Santa Clara and State of California, have invented certain new and useful Improvements in Prune Dippers and Graders, of which the following is a specification.

My invention relates to machines for continuously dipping and grading prunes or other like fruit.

The object of my invention is to provide a self-contained machine, forming a complete unit in itself, for continuously receiving the fresh fruit, dipping it in the caustic solution, grading it according to size, and spreading it upon the drying trays. Other objects of my invention are to provide, in such a machine, improved means for delivering the fruit into the dipping member and receiving it therefrom, simple and efficient means for continuously advancing the fruit through the entire machine, and means for rapidly and effectively spreading the fruit upon the drying trays. Other objects and advantages will become apparent from the following description of a preferred embodiment of my invention. It is to be understood, however, that the form and construction of the machine may be varied, within the limits of the claims hereto appended, from that herein illustrated and described, without departing from the essential principles of the invention.

With this in view, a preferred embodiment of my invention will now be fully described with reference to the accompanying drawings, wherein—

Fig. 1 is a plan view of the complete machine.

Fig. 2 is a side elevation thereof.

Figure 3:
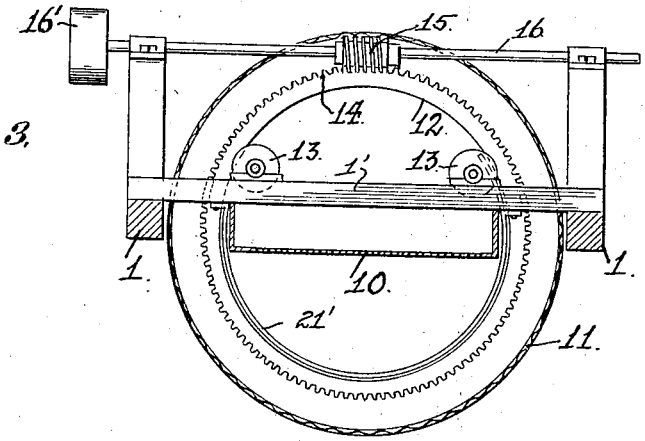
Figure 4:
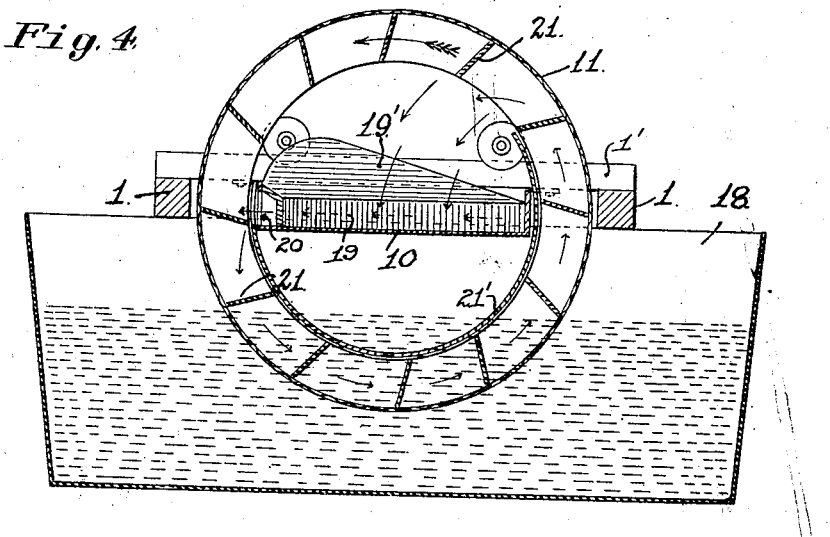

Figs. 3 and 4 are sections taken in the direction of the arrow respectively on the lines 3—3 and 4—4 of Fig. 1.

Fig. 5 is a plan view, enlarged, of the shaker.

Fig. 6 is a longitudinal section of the same.

Fig. 7 is a plan view of the tray frame.

Fig. 8 is a side elevation of the same.

Fig. 9 is a sectional detail taken on the line 9—9 of Fig. 7.

In the drawings, the reference numeral 1 designates a fixed supporting frame, in the upper portion of which is mounted a shaker 2, which extends the entire length of the frame 1, and is suspended by links 3 from transverse rods 4. Said shaker has a slight inclination downward toward the discharge end, (at the right of Figs. 1 and 2) and is given a reciprocating motion, to cause the fruit to advance toward said discharge end, by pitman rods 5 associated with eccentrics 6 mounted upon a continuously rotated shaft 7, said shaft having a pulley 8 for receiving power from any suitable means not shown. The shaker 2 is provided, at its receiving end, with a dirt screen 9, Figs. 1 and 5, over which the fruit is advanced for removing dirt and smaller foreign particles therefrom. Immediately following said dirt screen 9, the shaker 2 is narrowed, as shown at 10, this narrow portion extending through a continuously rotating drum 11 which constitutes the dipping member.

The drum 11 is provided with flanges 12, one of which is shown in Fig. 3, adapted to run upon grooved or flanged supporting rollers 13, and is rotated by means of a peripheral worm ring 14 adapted to be engaged by a worm 15 mounted upon a continuously rotating shaft 16, said shaft having a pulley 16', which may be connected by a belt, indicated at 17 in Fig. 1, with a pulley 17' mounted upon on the shaft 7. The drum 11 has a perforated or screen periphery, and its lower portion lies within a fixed tank 18, Figs. 2 and 4, carried by the frame 1 and adapted to contain the lye or other caustic solution in which the fruit is dipped to break its skin. The tank 17 may be provided with any suitable means for heating the solution contained therein, as for example the coils shown at 18' in Fig. 2.

The narrow portion 10 of the shaker 2, lying within the drum 11, is provided with a diagonal baffle 19, Figs. 4, 5 and 6, the upper portion of which is inclined from the vertical, as shown at 19'. This baffle 19 directs the fruit, advancing from the dirt screen 9, toward the lower side of the shaker as viewed in Fig. 5, or the left as viewed in Fig. 4, and said fruit passes through an aperture indicated at 20 in Figs. 4 and 5, in the side wall of said shaker, and enters the drum 11, as shown by the arrows. Said drum is provided with buckets 21 upon its inner periphery, into which the fruit is deposited from the aperture 20 in the side of the shaker. A stationary guide or boot 21', formed of a semi-cylindrical member positioned in close proximity to the inner edges of the buckets 21 and supported by the cross members 1' of the frame 1, as shown in Figs. 3 and 4, retains the fruit within said buckets 21, and causes it to be carried into and through the caustic solution by the rotation of the drum. As said fruit is lifted up out of the solution by the buckets 21, it falls therefrom over the end of the boot 21' onto the shaker 2 to the rear of the baffle 19, the inclined portion 19' of said baffle preventing any portion of said fruit from falling on the forward side of the baffle 19. This portion of the shaker, upon which the dipped fruit is deposited by the drum 11, is provided with a perforated floor, as indicated at 22 in Fig. 5, to permit the caustic solution carried up with the fruit to drain back into the tank 18, the fruit being advanced, by the motion of the shaker 2, out of the open rear end of the drum 11. Thus the fruit, advancing over the shaker 2 longitudinally from the dirt screen 9, is directed laterally by the diagonal baffle 19 into the buckets 21 of the rotating drum 11, and by them is carried through the caustic solution, lifted up, and deposited again upon the shaker 2 to the rear of said baffle 19, to resume its longitudinal travel along said shaker.

The shaker 2 is provided with a drip screen 23, Figs. 1 and 5, to the rear of the drum 11, which allows any remaining caustic solution to drain off and drip into a lower tank or receptacle 24, Fig. 2. The next succeeding section 25, Figs. 1 and 5, of the shaker has its floor provided with closely spaced needle points adapted to prick the skins of the fruit as it rolls over them, thus furthering the action of the caustic solution. A grading screen 26 is carried by the shaker to the rear of the needle board 25. The larger fruit rolls over said screen to the rear end 27 of the shaker 2 and falls off, whereas the smaller fruit drops through said screen to a false floor 28, Fig. 6, carried by the shaker 2 below said screen, and is discharged from the rear end 29 of said floor.

A frame 30, Figs. 2 and 7, is mounted beneath the rear or discharge end of the frame 1, and is independently supported by flexible rods 31. Said frame 30 is continuously shaken, in the same direction as the shaker 2 but with less movement, by a rod 32 pivotally connected at 33 with one of the suspending links 3 of the shaker 2, said connection 33 being positioned between the fulcrum of said link and its connection with the shaker 2, so that the shaking movement of the frame 30 is less violent than that of said shaker 2.

The frame 30 has two pairs of guides 34 upon which the trays 35 and 36 are placed, as shown in Figs. 2 and 8. These trays are preferably the ordinary drying trays, and are positioned with their longer axes lying transversely to the length of the machine. The guides 34 are positioned upon the tray frame 30, moreover, in such a manner that the trays 35 and 36 are slightly inclined away from each other, the inner or adjacent sides being the higher. The inner, or adjacent guides 34, are rendered adjustable, to vary the inclination of the trays, by being mounted upon supporting members 37, Figs. 8 and 9, which are adjustably supported by nuts 38 screwed upon studs 39 rising from the central cross member 40 of the frame 30. The trays are so positioned that the rear, or higher side of the forward tray 35 lies beneath the discharge end 29 of the false floor 28, and the forward, or higher side of the rear tray 36, lies beneath the discharge end 27 of the floor of the shaker 2. Thus the larger fruit rolls off the grading screen 26 onto the rear tray 36, and the smaller fruit rolls off the false floor 28 onto the forward tray 35. Both trays, being continuously shaken by the frame 30, spread the fruit out over their surfaces, without the necessity of handling. When said trays are full, they are removed from the machine and empty trays inserted in their places.

Thus the operation of my machine, as well as the progression of the fruit through it, is continuous. The fruit enters the receiving end of the machine continuously, and passes successively over the dirt screen 9, through the dipping member or drum 11, then over the drip screen 23, the needle board 24, and the grader 26, and is deposited upon the trays 35 and 36 and effectively spread thereupon ready for drying.

It should be noted that by passing the shaker 2 through the dipping drum 11, I am able to make a complete machine with very few moving parts, all the shaking members, with the exception of the tray frame 30, being carried by the main shaker 2. This simplifies the construction materially, there being no necessity for separate shakers for feeding the fruit into the dipping member and receiving it therefrom. Moreover, the construction of the tray frame 30 and its relation to the grading members 26 and 28 enables the machine to deposit and spread the graded fruit upon the trays as fast as it is fed through the previous portions of the device, without necessitating any hand labor except the mere placing and removing of the trays themselves, and even this operation is reduced to its simplest terms, the construction of the tray frame 30 and its guides 34 enabling the trays to be slid into position from one side and removed from the other.

I claim:

1. A machine for the described purpose comprising a shaker adapted to receive the fruit at one end, advance it, and discharge it at the other end; a dipping member associated with said shaker at a point between the receiving and discharge ends thereof; and means for transferring the fruit from said shaker to said dipping member and back again to said shaker.

2. A machine for the described purpose comprising a shaker adapted to receive and advance the fruit; a dipping member associated with said shaker; and means for transferring the fruit from said shaker to said dipping member and back again to said shaker.

3. A machine for the described purpose comprising a shaker adapted to receive and advance the fruit; a dipping member associated with said shaker; and means for continuously transferring the fruit from said shaker to said dipping member and back again to said shaker.

4. A machine for the described purpose comprising a shaker adapted to receive and advance the fruit; a dipping member associated with said shaker; means carried by said shaker for transferring the fruit therefrom into said dipping member; and means carried by said dipping member for returning the dipped fruit to said shaker.

5. A machine for the described purpose comprising a hollow rotating dipping member; means extending through said dipping member for receiving and advancing the fruit; and means for transferring the fruit from said receiving and advancing means to said dipping member and back again to said receiving and advancing means.

6. A machine for the described purpose comprising a member adapted to receive, advance, and discharge the fruit, a dipping member associated with the first member between its receiving and discharging portions; and means for transferring the fruit from said first member to the dipping member and back again to said first member.

7. A machine for the described purpose comprising a hollow rotating dipping member; a shaker extending through said dipping member and adapted to receive and advance the fruit; and means for transferring the fruit from said shaker to said dipping member and back again to said shaker.

8. A machine for the described purpose comprising a hollow rotating dipping member; a fruit advancing member extending axially through said dipping member; and means for transferring the fruit from said advancing member to said dipping member and back again to said advancing member.

9. A machine for the described purpose comprising a hollow rotating dipping member; and a shaker positioned therewithin and having a portion adapted to feed the fruit into said dipping member and a second portion adapted to receive the dipped fruit from and advance it out of said dipping member.

10. A machine for the described purpose comprising a hollow rotatable dipping member having interior peripheral buckets; and a shaker positioned therewithin and provided with a portion adapted to feed the fruit into said dipping member and a second portion adapted to receive the dipped fruit from said buckets and advance it out of said dipping member.

11. A machine for the described purpose comprising a hollow rotatable dipping member; a shaker positioned therewithin; and a baffle extending diagonally across said shaker, said shaker being adapted to receive the fruit, feed it into said dipping member from one side of said baffle, receive it from said dipping member upon the other side of said baffle, and advance it out of said dipping member.

12. A machine for the described purpose comprising a hollow rotatable dipping member; a shaker extending therethrough and adapted to receive and advance the fruit; means for transferring the fruit from said shaker to said dipping member and back again to said shaker; and a drip screen carried by said shaker for receiving the fruit subsequently to its passage through said dipping member.

13. A machine for the described purpose comprising a hollow rotatable dipping member; a shaker extending therethrough and adapted to receive and advance the fruit; means for transferring the fruit from said shaker to said dipping member and back again to said shaker; and screens carried by said shaker and adapted to act upon the fruit both before and after its passage through said dipping member.

14. A machine for the described purpose comprising a hollow rotatable dipping member; a shaker extending therethrough and adapted to receive and advance the fruit; means for transferring the fruit from said shaker to said dipping member and back again to said shaker; and means carried by said shaker for pricking the fruit subsequently to its passage through said dipping member.

15. A machine for the described purpose comprising a hollow rotatable dipping member; a shaker extending therethrough and adapted to receive and advance the fruit; means for transferring the fruit from said shaker to said dipping member and back again to said shaker; and means carried by said shaker for grading the fruit subsequently to its passage through said dipping member.

16. A machine for the described purpose comprising a hollow rotatable dipping member; a shaker extending therethrough and adapted to receive and advance the fruit; means for transferring the fruit from said shaker to said dipping member and back again to said shaker; and means carried by said shaker for screening, pricking, and grading the fruit as it is advanced from said dipping member.

17. A machine for the described purpose comprising a shaker adapted to receive the fruit at one end, advance it, and discharge it from the other end; a dipping member associated with said shaker between the ends thereof; means for transferring the fruit from said shaker to said dipping member and back again to said shaker; a frame adapted to support a tray in position to receive the fruit from the discharge end of said shaker; and means for shaking said tray frame to spread the fruit received upon its tray.

18. A machine for the described purpose comprising a shaker adapted to receive the fruit at one end, advance it, and discharge it from the other end; a dipping member associated with said shaker between the ends thereof; means for transferring the fruit from said shaker to said dipping member and back again to said shaker; a frame adapted to support a tray in position to receive the fruit from the discharge end of said shaker; and a connection between said shaker and said tray frame for shaking the latter to spread the fruit received upon its tray.

19. A machine for the described purpose comprising a shaker adapted to receive the fruit at one end, advance it, and discharge it from the other end; a dipping member associated with said shaker between the ends thereof; means for transferring the fruit from said shaker to said dipping member and back again to said shaker; a frame adapted to support a tray in position to receive the fruit from the discharge end of said shaker; flexible supporting members for said frame; and means for shaking said frame to spread the fruit received upon its tray.

20. A machine for the described purpose comprising a shaker adapted to receive and advance the fruit; a dipping member associated with said shaker and adapted to deposit the dipped fruit thereupon; means carried by said shaker for separating the dipped fruit into two grades and separately discharging the same; a frame adapted to support two trays in position respectively to receive the two grades of fruit, and means for shaking said frame to spread the fruit upon said trays.

21. A machine for the described purpose comprising a shaker adapted to receive and advance the fruit; a dipping member associated with said shaker and adapted to deposit the dipped fruit thereupon; means carried by said shaker for separating the dipped fruit into two grades and separately discharging the same; a frame for supporting two adjacent trays transversely with respect to said shaker, said trays being positioned respectively to receive the two grades of fruit; and means for shaking said frame to spread the fruit upon said trays.

22. A machine for the described purpose comprising a shaker adapted to receive and advance the fruit; a dipping member associated with said shaker and adapted to deposit the dipped fruit thereupon, a grading screen carried by said shaker and adapted to discharge the larger fruit from its rear end; a false floor positioned below said grading screen and adapted to receive the smaller fruit therefrom and discharge it forwardly of the discharge end thereof; and a frame for supporting two adjacent trays transversely with respect to said shaker, said trays being positioned respectively to receive the two grades of fruit.

In testimony whereof I have signed my name to this specification.

ELMER S. ANDERSON.